United States Patent
Jurkiewicz et al.

(10) Patent No.: US 7,890,945 B2
(45) Date of Patent: Feb. 15, 2011

(54) METHOD FOR VERSIONING CLASSES LOADED IN AN OSGI-ENABLED J2EE ENVIRONMENT

(75) Inventors: Jared P. Jurkiewicz, Durham, NC (US); Albert H. Kurz, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 929 days.

(21) Appl. No.: 11/756,116

(22) Filed: May 31, 2007

(65) Prior Publication Data

US 2008/0301662 A1 Dec. 4, 2008

(51) Int. Cl.
*G06F 9/44* (2006.01)

(52) U.S. Cl. ...................................... 717/166; 717/170

(58) Field of Classification Search ................. 717/166, 717/170
See application file for complete search history.

(56) References Cited

U.S. PATENT DOCUMENTS 6,748,396 B2 * 6/2004 Klicnik et al. ..................... 1/1
7,640,542 B2 * 12/2009 Herenyi et al. ............... 717/177
7,644,403 B2 * 1/2010 Atsatt .......................... 717/166
2007/0011451 A1 * 1/2007 Botzum et al. ............... 713/166

OTHER PUBLICATIONS

The IP.com Journal, v6n9B, pp. 13, 118, 119, Sep. 13, 2006.
Understanding the Java ClassLoader, Greg Travis, pp. 1-18, Apr. 24, 2001.

* cited by examiner

*Primary Examiner*—Wei Y Zhen
*Assistant Examiner*—Chih-Ching Chow
(74) *Attorney, Agent, or Firm*—Cantor Colburn LLP; Steven Chiu

(57) ABSTRACT

According to exemplary embodiments, a method is provided for versioning classes in an OSGi-enables J2EE environment. A first version of code is packaged into a first OSGi (Open Service Gateway initiative) bundle, and the first version of code is marked for export. A second version of code is packaged into a second OSGi bundle, and the second version of code is not marked for export. A determination is made whether an application needs the first version of code or the second version of code. If the application needs the first version of code, a classloader hierarchy is constructed using existing classloaders. If the application needs the second version of code, a new classloader is created which is able to load application classes and unversioned application server classes normally, while only loading the correct version of versioned code.

4 Claims, 3 Drawing Sheets

METHOD FOR VERSIONING CLASSES LOADED IN AN OSGI-ENABLED J2EE ENVIRONMENT

BACKGROUND

The present invention relates generally to class versioning, and, more particularly, to class versioning in an OSGi-enabled J2EE environment.

Java and all Java-based marks are a trademark or registered trademark of Oracle Corporation. Java language is run on a java virtual machine (JVM). A Java program is composed of many individual class files, each of which may correspond to a single Java class. These class files are not loaded into memory all at once but are loaded on demand, as needed by a program. A classloader is the part of the JVM that loads classes into memory.

Java 2 Platform Enterprise Editon (J2EE) is a platform-independent, Java-centric environment from Sun for developing, building and deploying Web-base enterprise applications online. The J2EE platform includes set of services, APIs, and protocols that provide the functionality for developing multitiered, web-based applications.

A J2EE application server may provide a classloader hierarchy, as shown in FIG. 1. In this hierarchy, there are three levels: the application classloader level 110, the application server classloader level 120, and the JVM classloader level 130. The application server runtime and extensions may be packaged in Open Service Gateway initiative (OSGi) bundles. The middle level, the application server classloader level 120, may contain a network of classloadrs, one classloader per OSGi bundle. The server provides an application classloader per application at the application classloader level 110.

A problem arises when an application server uses an OSGi classloading implementation that does not natively support class versioning. As explained above, an OSGi implementation in a J2EE environment includes bundles, each with a single associated classloader. An export mechanism packages visible outside a given bundle and a companion mechanism exists for declaring a dependency on another bundle (to use the other bundle exported packages). With the conventional classloader hierarchy there is no way to choose between different versions of a class loaded at the applications server classloader level. This becomes a problem when applications and other portions of the application server runtime require different versions of code from the application server runtime and its extensions. This presents a problem for the application developer, as he or she must solve the class versioning problem. This is an inefficient and time-consumming process. Thus, there exists a need for a technique for enabling a choice between class versions in an OSGI-enabled J2EE environnment.

SUMMARY

According to exemplary embodiments, a method is provided for versioning classes in an OSGi-enabled J2EE environment. A first version of code is packaged into a first OSGi bundle, and the first version of code is marked for export. A second version of code is packaged into a second OSGi bundle, and the second version of code is not marked for export. A determination is made whether an application needs the first version of code or the second version of code. If the application needs the first version of code, a classloader hierarchy is constructed using existing classloaders. If the application needs the second version of code, a new classloader is created, and the new classloader is used to load an application class.

BRIEF DESCRIPTION OF THE DRAWINGS

Referring to the exemplary drawings, wherein like elements are numbered alike in the several Figures.

DETAILED DESCRIPTION

As explained above, conventional classloader hierarchies do not provide a mechanism for choosing between different versions of application server classes. This becomes a problem when different versions are needed.

As an illustrative example of this problem, suppose that version 1 (V1) of the com.mycompany.mylib Java package is packaged in an OSGi bundle B1 and used by a user application and other pieces of an application server runtime. Suppose further that other user applications and other portions of the application server runtime require an uplevel version 2 (V2) of the com.mycompany.mylib code. In addition, a set of analogous packages, each at some version in B1 and at some other version in B2, may be needed in a similar manner.

Suppose that the application server allows fro the packing and deployment of the V2 code into a new OSGi bundle, B2, with its own classloader but does not allow for using declarative metadata to specify which version of the com.mycompany.mylib jar should be used by a client. For a given class, com.mycompany.mylib.Class X, there is no way to choose between the V1 and V2 versions.

One solution to this problem is to install one version of the jar, save the V1 jar, into the application server, making it available via an application server classloader, and to package the V2 code into every application that requires it. Then if the application server allows for parent last or application first class loading, the application server would try to load a given class using an application classloader before traversing the normal class loader hierarchy.

A drawback of this solution is the need to redundantly package the same libraries with every application rather than being able to use a singly installed copy of this jar. This, in turn, creates a maintenance problem. This might also require runtime client R1 of the V2 code to be removed from runtime installation directories and to be packaged within each application, since it would be problematic to travel down the classloader hierarchy to load V2 code in an application-level classloader from a R1 that was loaded by an application server classloader further up the hierarchy.

Figure 1:
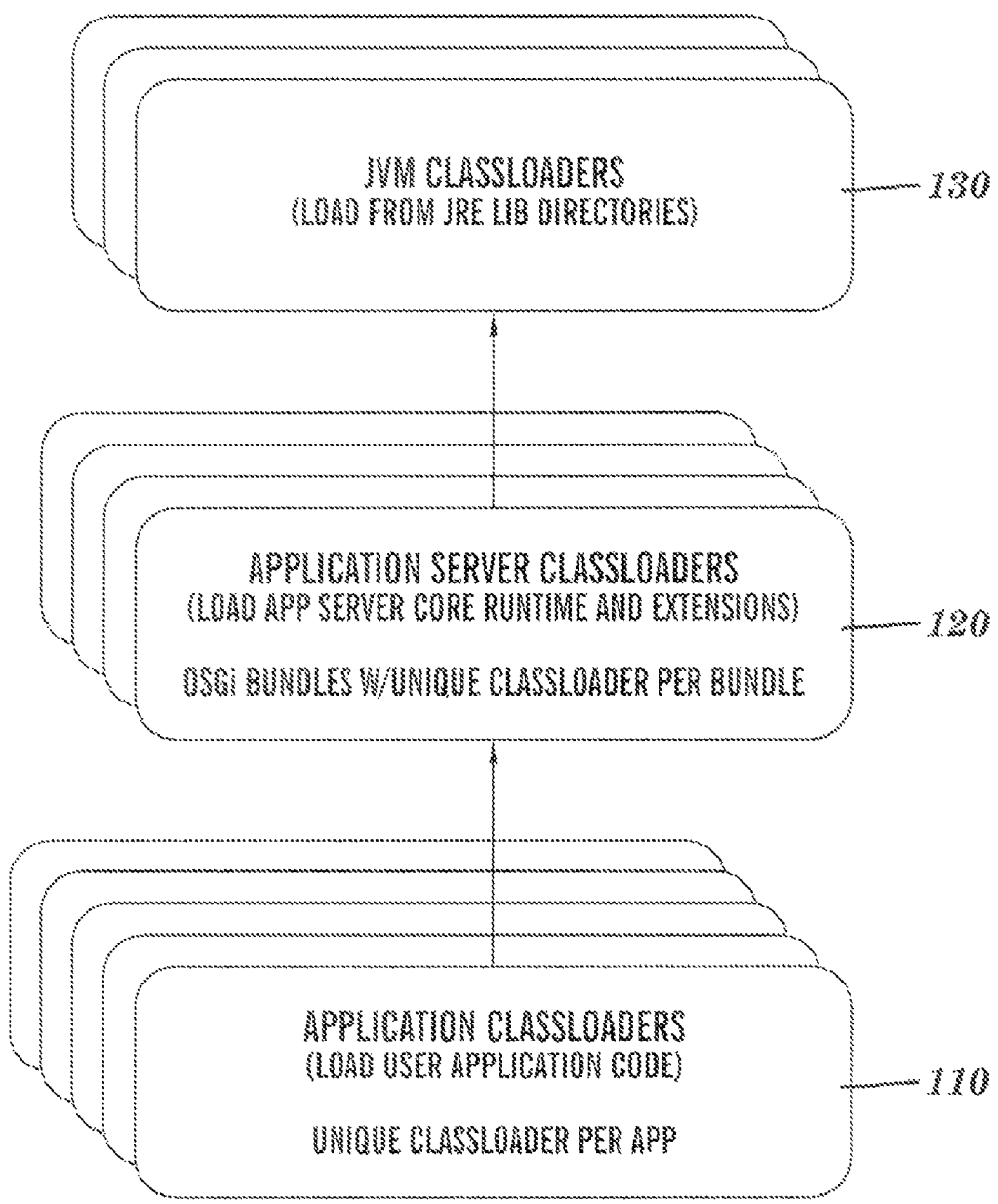
FIG. 1 illustrates a conventional J2EE classloader hierarchy.
Figure 2:
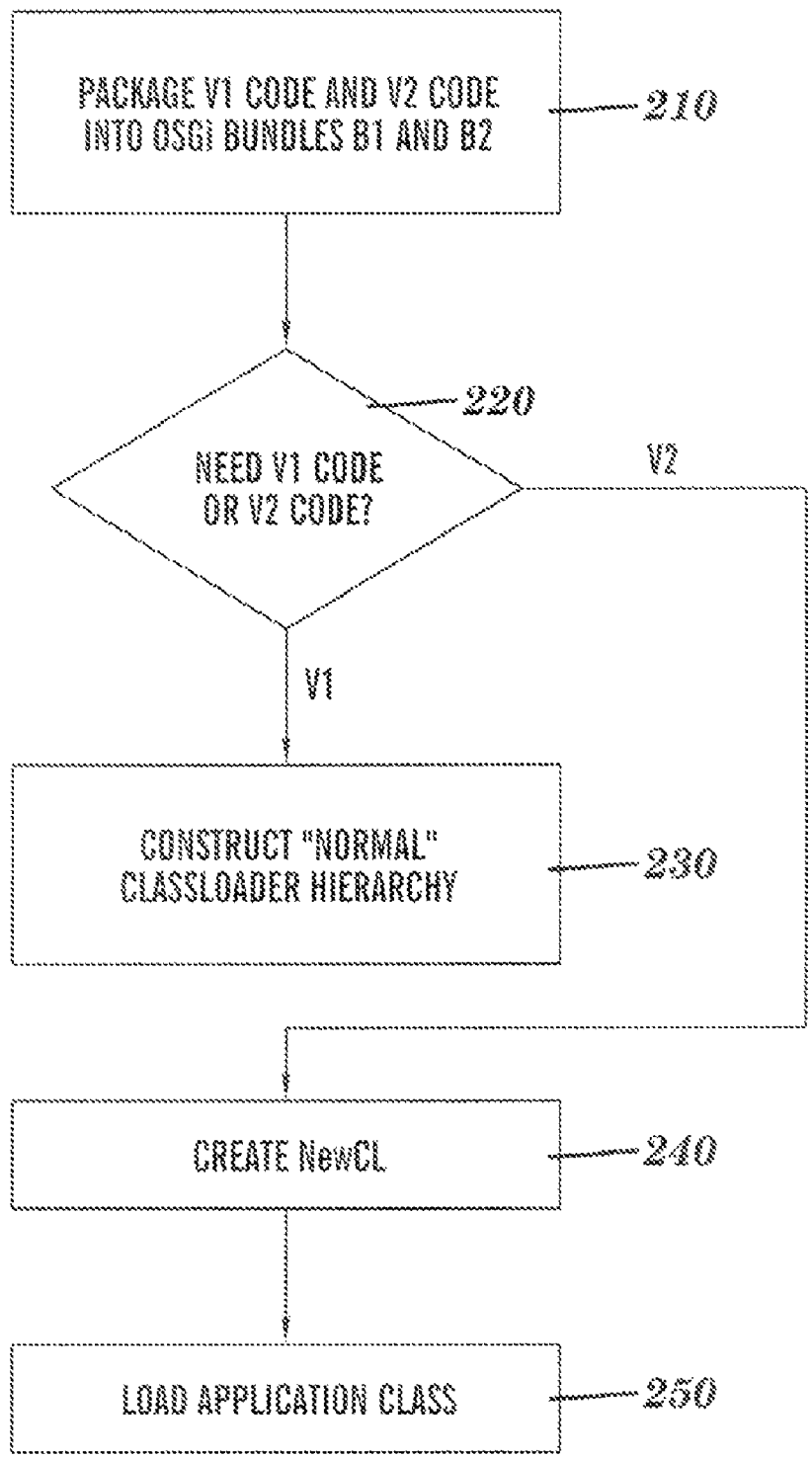
FIG. 2 illustrates a method for versioning classes in an OSGi-enabled J2EE environment according to an exemplary embodiment.
Figure 3:
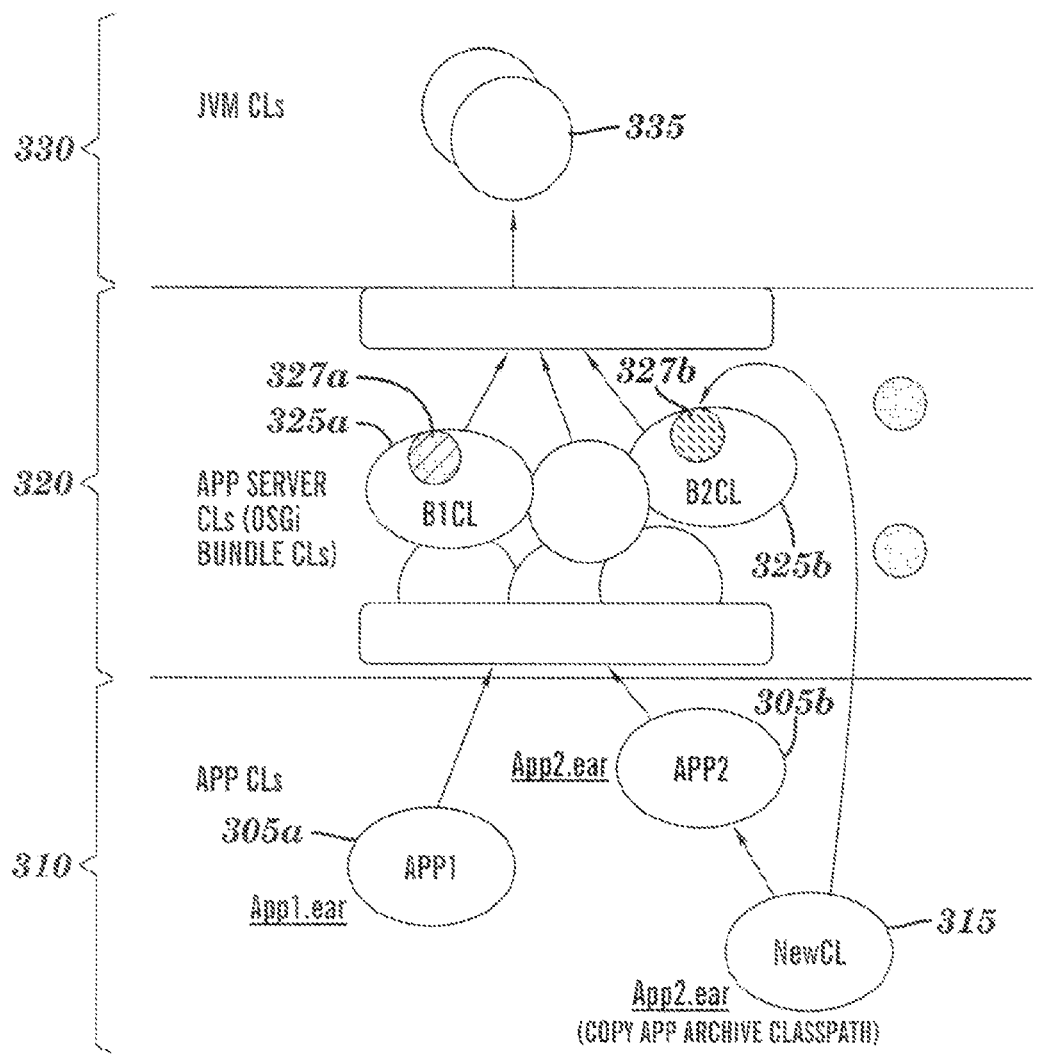
FIG. 3 illustrates a J2EE classloader hierarchy including multiple versions of classes according to an exemplary embodiment.

According to an exemplary embodiment, a technique is provided for versioning classes in an OSGi enabled J2EE environment. A method for versioning classes according to an exemplary embodiment is illustrated in FIG. 2. A versioned classloader hierarchy, according to exemplary embodiments, is illustrated in FIG. 3.

Referring to FIG. 2, a method for versioning begins with step 210 at which a first version (V1) of code is packaged into an OSGi bundle B1 and marked for export via an OSGi bundle manifest. Also, a second version (V2) of code is packaged into an OSGi bundle B2 but not marked for export via the OSGi bundle manifest. According to an exemplary embodiment, all runtime clients of V2 are packaged within the same bundle B2 So, existing runtime clients of the com.mycompany.mylib Java package continue to use the V1 code, since the V2 code is invisible to these clients. This is based on the assumption that the V1 code is marked for export, since this means it is already being used by runtime and application clients.

Next, for application com.mycompany.mylib clients, application initialization is hooked into in an application server-specific manner, and a determination is made whether V1 or V2 of com.mycompany.mylib is needed at step 220. Those skilled in the art will appreciate that there are many techniques that may be used for determining a version of code that is needed. If the application requires V1 code, then the application server is allowed to construct a "normal" classloader hierarchy at stem 230. This is due to the fact that the V2 code is not exported via an OSGi bundle manifest and therefore is hidden from the application.

If the application requires V2 code, then a new classloader, NewCL, is created at step 240 with the application archive binaries on its path. The application server is instructed to use the NewCL to load the very first application class at step 250 by plugging into the application server at the leaf node of the classloader hierarchy.

According to an exemplary embodiment, the NewCL uses a three-part strategy when loading a class C. If class C is a member of a versioned package com.mycompany.mylib V2 (or a member of a versioned analogous package) contained in bundle B2, the B2 classloader is used to load class C. If class C is part of an application delegated to the original application classloader, i.e., the classloader originally constructed by the application server for the application. This is valuable since the original application class holder is hooked into the "normal" classloader hierarchy in the standard manner. This solution does not require that the V2 library is packaged along with its runtime clients within every application needing V2.

Referring to FIG. 3, a classloader hierarchy including different versions is shown. At the application classloader level 310, there are two application classloaders, App1CL 305*a* and App2CL 305*b*. A NewCL 315 is associated with App2CL 305*b*. At the application server level 320, there are two bundles, B1 and B2, having associated classloaders, B1CL 325*a* and B2CL 325*b*, respectively. The B1CL 325*a* classloader includes V1 code 327*a* marked for export to the application and the rest of the runtime clients. The B2CL 325*b* classloader includes V2 code 327*b* that is only available to the NewCL 315 and other classes packaged in the B2 bundle. The JVM classloader level 330 includes classloaders 335.

According to an exemplary embodiment, the NewCL has two inputs: the original application classloader constructed by the application server for an application and a list of packages including com.mycompany.mylib and analogous packages.

During the construction of NewCL, a reference to the classloader associated with com.mycompany.mylib V2 is obtained. This is the B2 bundle's classloader B2CL 325*b*. The classpath associated with the original application classloader is also obtained. This classpath typically corresponds to code included in the application archive file.

Referring to FIG. 3, the NewCL is plugged as a "leaf node" into the classloader hierarchy, and B2CL may be referenced, e.g., by loading a marker class that is only in the V2 jar (and not the V1 jar) and getting the classloader from the V2 jar. This is based on the assumption that is is not possible or it is undesirable to rearrange any other aspect of the classloader hierarchy, besides altering the leaf node.

When a new class C is loaded from application code, the current classloader will be the NewCL. If class C is in com.mycompany.mylib (or an analogous package included in bundle B2), then B2CL is directed to load class C. Otherwise. NewCL may attempt to load class C from the application archive from the original application classloader's classpath. If class C is not found in the application archive, then the request to load C may be delegated to the original application classloader constructed by the application server for the application. The original classloader is valuable at this point because it is constructed in its "normal" place within the classloader hierarchy, with the normal parent classloader and the normal delegation path.

While the invention has been described with reference to exemplary embodiments, it will be understood by those skilled in the art that various changes may be made and equivalents may be substitued for elements thereof without departing from the scope of the invention. In addition,may modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method for versioning classes in an Open Service Gateway initiatve (OSGI)-enabled Java 2 Platform Enterprise Edition J2EE environment, comprising:
    packaging a first version of code into a first OSGi bundle, wherein the first version of code is marked for export;
    packaging a second version of code into a second OSGi bundle, wherein the second version of code is not marked for export;
    determining whether an application needs the first version of code or the second version of code;
    if the application needs the first version of code, constructing a classloader hierarchy using existing classloaders; and
    if the application needs the second version of code, creating a new classloader and using the new classloader to load an application class; wherein the new classloader loads the application class by plugging into a leaf node of a classloader hierarchy constructed using existing classloaders.

2. The method of claim 1, wherein runtime clients of the second version of code are packaged within the second OSGi bundle.

3. The method of claim 1, wherein the new classloader has two inputs: an original application classloader constructed by application server for the application and a list of packages included in the second OSGi bundle.

4. The method of claim 3, wherin the step of using the new classloader to load the application class comprises:
    using a classloader of the second OSGi bundle to load the appliction class if the application class is a member of the second OSGi bundle; and
    using the new classloader to load the application class if the application class is part of an application archive; else delegating loading of the application class to the original application classloader.

\* \* \* \* \*